United States Patent
Lin

(12) 
(10) Patent No.: US 6,588,997 B1
(45) Date of Patent: Jul. 8, 2003

(54) BOLT FIXING ASSEMBLY

(75) Inventor: Tsung-Lung Lin, Kaohsing Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 10/067,898

(22) Filed: Feb. 8, 2002

(51) Int. Cl.⁷ ............................. F16B 13/04; F16B 21/00
(52) U.S. Cl. .............................. 411/21; 411/61; 411/74; 411/347
(58) Field of Search ........................ 411/21, 57.1, 60.1, 411/61, 73, 74, 347

(56) References Cited

U.S. PATENT DOCUMENTS

| | | | | |
|---|---|---|---|---|
| 3,269,251 A | * | 8/1966 | Bass | 411/21 |
| 3,417,525 A | * | 12/1968 | Dashio | 411/74 X |
| 4,902,179 A | * | 2/1990 | Harker | 411/21 |
| 5,704,752 A | * | 1/1998 | Logerot | 411/21 X |

* cited by examiner

*Primary Examiner*—Neill Wilson
(74) *Attorney, Agent, or Firm*—Bacon & Thomas, PLLC

(57) ABSTRACT

A bolt fixing assembly comprises a bolt body, a resilient sleeve, and a pressing member. The bolt body includes a head and a shank. The resilient sleeve includes plural toothed plates integrally formed on an outer periphery thereof. Each resilient toothed plate is initially located in an interior space of the resilient sleeve and movable along a radially outward direction to a position beyond the outer periphery of the resilient sleeve. The pressing member includes a central hole for receiving the shank of the bolt body. The central hole has an inner periphery configured corresponding to an outer periphery of the shank. The pressing member includes plural ribs for respectively, selectively urging the resilient toothed plates of the resilient sleeve to the position beyond the outer periphery of the resilient sleeve.

9 Claims, 5 Drawing Sheets

BOLT FIXING ASSEMBLY

BACKGROUND OF THE INVENTION

1. Field of the Invention

The present invention relates to a bolt fixing assembly. In particular, the present invention relates to a bolt fixing assembly comprising a bolt body that may urge ribs of a pressing member to turn, thereby pressing against resilient toothed plates of a resilient sleeve such that the resilient toothed plates bite an inner wall defining an engaging hole of a plate. An object is thus fixed on the plate.

2. Description of the Related Art

FIG. 1 of the drawings illustrates a conventional bolt fixing assembly comprising a bolt body 91 and an eccentric sleeve 92. The bolt body 91 includes a shank 911, and the eccentric sleeve 92 includes a central hole 921, an eccentric screw 922, and a protrusion 923. The shank 911 of the bolt body 91 is extended through a hole 931 in a hinge base 93 and a hole 941 in a positioning plate 94. The shank 911 of the bolt body 91 is force-fitted in the central hole 921 of the eccentric sleeve 92. When the bolt body 91 is turned, the eccentric screw 922 of the eccentric sleeve 92 irreversibly bites an inner wall defining an engaging hole 95 of a plate 96. In addition, an engaging member 942 on the positioning plate 94 engages with the protrusion 923 of the eccentric sleeve 92 to thereby restrain rotational movement of the eccentric screw 922.

Although the bolt fixing assembly may tightly fix the hinge base 93 to the plate 96, the user must apply a considerable force to turn the bolt body 91 so as to cause the eccentric screw 922 of the eccentric sleeve 92 to firmly bite the inner wall defining the engaging hole 95 of the plate 96. The assembly procedure is apparently inconvenient, and the slot 912 in the bolt body 91 could be damaged by the considerable rotational force for driving the bolt body 91. Further, the inner wall defining the engaging hole 95 of the plate 96 is damaged at the time the eccentric screw 922 is inserted into the engaging hole 95. Recovery of the engaging hole 95 is thus impossible.

SUMMARY OF THE INVENTION

It is the primary object of the present invention to provide a bolt fixing assembly comprising a bolt body, a resilient sleeve, and a pressing member received in the resilient sleeve. The resilient sleeve receiving the pressing member is loosely mounted in an engaging hole of a plate, and a tool is used to turn the bolt body to urge resilient toothed plate of the resilient sleeve to bite an inner wall defining the engaging hole of the plate. Thus, the bolt fixing assembly in accordance with the present invention allows easy turning to the bolt body, and the fixing can be achieved quickly. In addition, the bolt can be removed if the bolt body is turned in a reverse direction such that the engaging hole of the plate would not be damaged. Thus, the bolt fixing assembly can be used with the same engaging hole of the plate for many times.

A bolt fixing assembly in accordance with the present invention comprises a bolt body, a resilient sleeve, and a pressing member. The bolt body includes a head and a shank. The resilient sleeve includes plural toothed plates integrally formed on an outer periphery thereof. Each resilient toothed plate is initially located in an interior space of the resilient sleeve and movable along a radially outward direction to a position beyond the outer periphery of the resilient sleeve. The pressing member includes a central hole for receiving the shank of the bolt body. The central hole has an inner periphery configured corresponding to an outer periphery of the shank. The pressing member includes plural ribs for respectively, selectively urging the resilient toothed plates of the resilient sleeve to the position beyond the outer periphery of the resilient sleeve.

The resilient sleeve is loosely mounted in an engaging hole of a plate. The bolt body is extended through a hole of an object to be fixed to the plate into the central hole of the pressing member. The resilient sleeve is turned to drive the pressing member to turn. The ribs of the pressing member urge the resilient toothed plates of the resilient sleeve to the position beyond the outer periphery of the resilient sleeve. The teeth of the resilient toothed plates bite an inner wall defining the engaging hole of the plate. Thus, the object is fixed to the plate.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

A preferred embodiment in accordance with the present invention will now be described with reference to the accompanying drawings.

Figure 2:
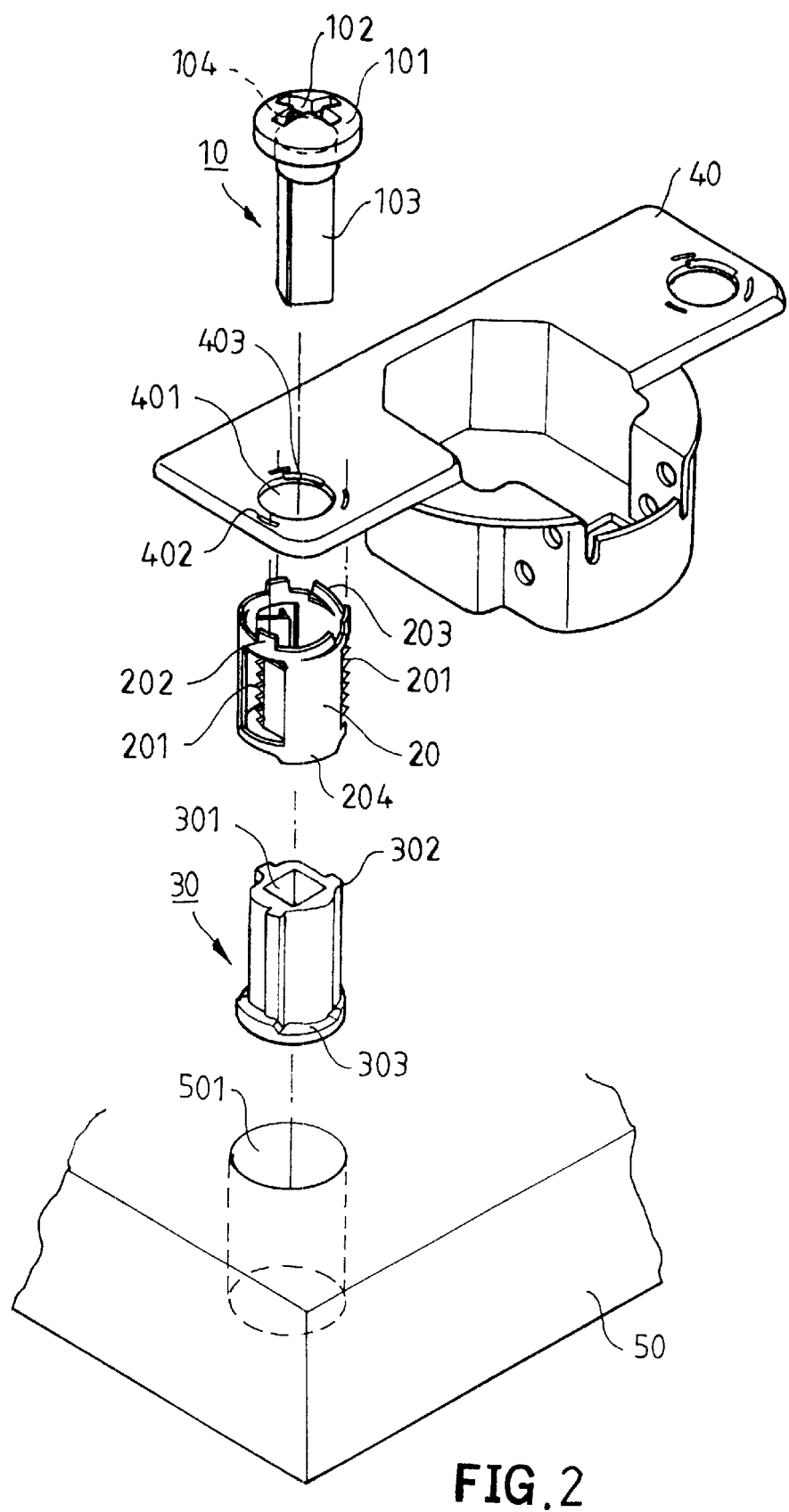
FIG. 2 is an exploded perspective view of a bolt fixing assembly in accordance with the present invention.

Referring to FIG. 2, a bolt fixing assembly in accordance with the present invention generally includes a bolt body 10, a resilient sleeve 20, and a pressing member 30. The bolt fixing assembly is used to fix a hinge base 40 (an object to be fixed) on a plate 50. The bolt body 10 includes a head 101 and a shank 103. A slot 102 is defined in the head 101 for engaging with an end of a tool (not shown). The shank 103 preferably has a non-circular contour in an outer periphery thereof, such as square, rectangular, or triangular. The shank 103 includes a protrusion 104. The resilient sleeve 20 includes plural toothed plates 201 integrally formed on an outer periphery thereof. Further, the resilient sleeve 20 includes plural positioning blocks 202 and resilient pieces 203 on a top thereof. Further, plural extensions 204 extend from a bottom of the resilient sleeve 20. Each toothed plate 201 is initially located in an interior space of the resilient sleeve 20 and movable along a radially outward direction to a position beyond the outer periphery of the resilient sleeve 20. Each toothed plate 201 includes plural teeth (not labeled) on a side thereof.

The pressing member 30 includes a central hole 301, plural ribs 302 on an outer periphery thereof, and plural recesses 303 on a bottom edge thereof. The shank 103 of the bolt body 10 is tightly engaged in the central hole 301 of the pressing member 30 without the risk of disengagement. Each rib 302 is aligned with an associated resilient toothed plate 201 and axially arranged on the outer periphery of the pressing member 30 with the recesses 303 being respectively engaged with the extensions 204 of the resilient sleeve 20.

The hinge base 40 includes plural holes 401, plural positioning slots 402 surrounding each hole 401, and a restraining slot 403 adjacent to each hole 401 of the hinge base 40. The positioning slots 402 surround an associated hole 401 and are spaced at angular intervals. The restraining slot 403 may engage with the protrusion 104 to restrain rotational movement of the bolt body 10.

Figure 3:
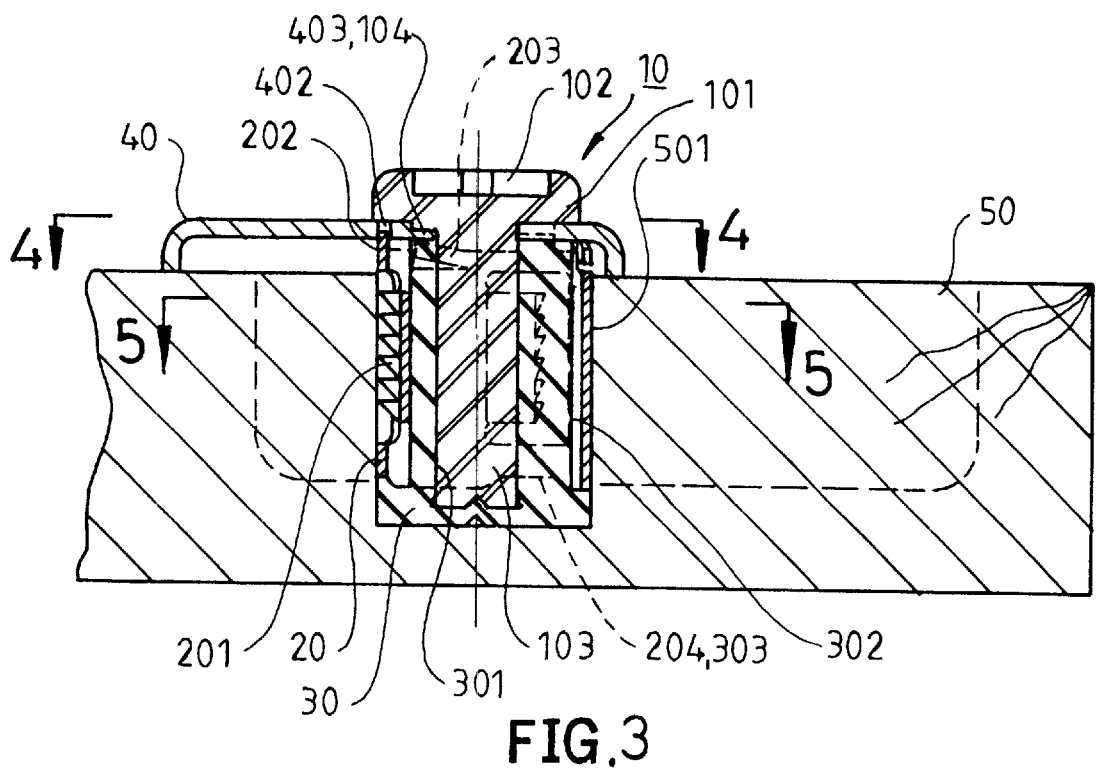
FIG. 3 is a partial sectional view of the bolt fixing assembly in accordance with the present invention in a state before fixing.
Figure 4:
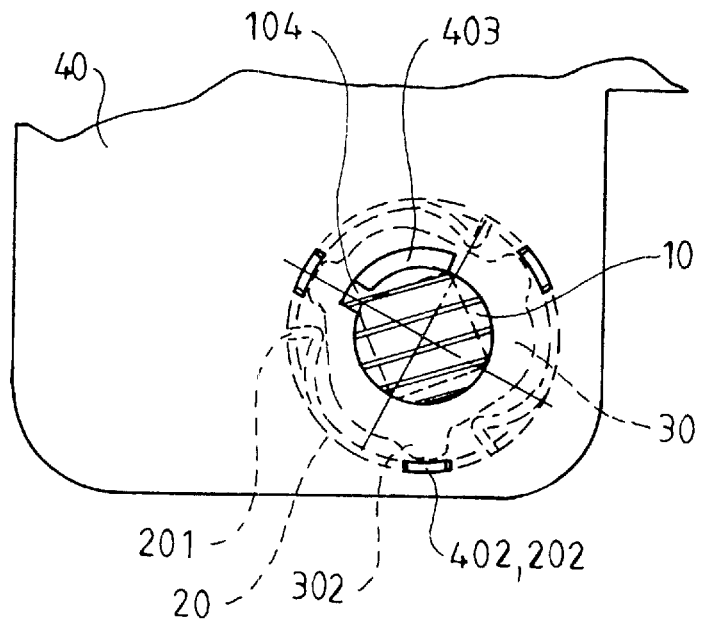
FIG. 4 is a sectional view taken along plane 4—4 in FIG. 3.
Figure 5:
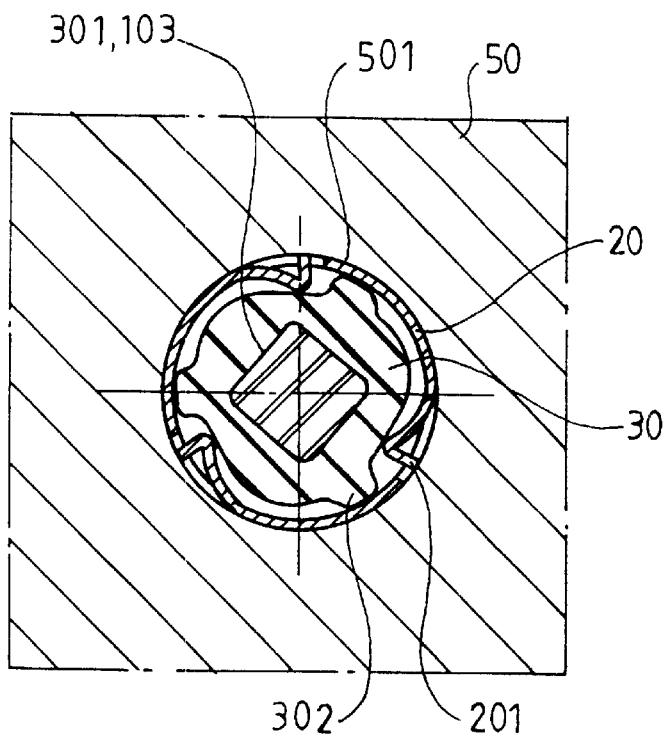
FIG. 5 is a sectional view taken along plane 5—5 in FIG. 3.

FIGS. 3 through 5 show the bolt fixing assembly in accordance with the present invention in a state in which the resilient toothed plates 201 have not bitten an inner wall defining the engaging hole 501 of the plate 50 yet. In assembly of the bolt body 10, the hinge base 40 (the object to be fixed), the resilient sleeve 20, and the pressing member 30, the shank 103 of the bolt body 10 is extended through the hole 401 of the hinge base 40 and the resilient sleeve 20 that receives the pressing member 30. The shank 103 is then tightly engaged in the central hole 301 of the pressing member 301 without the risk of disengagement. In this case, the extensions 204 of the resilient sleeve 20 are respectively engaged with the recesses 303 on the bottom edge of the pressing member 30. The ribs 302 of the pressing member 30 are received in an interior space of the resilient sleeve 20, but not press against the resilient toothed plates 201 of the resilient sleeve 20, best shown in FIG. 5. Further, each positioning block 202 of the resilient sleeve 20 is engaged in an associated positioning slot 402 of the hinge base 40. The resilient pieces 203 of the resilient sleeve 20 press against the hinge base 40 while exerting a force to urge the extensions 204 on the bottom of the resilient sleeve 20 to press against the recesses 303 of the pressing member 30.

Figure 6:
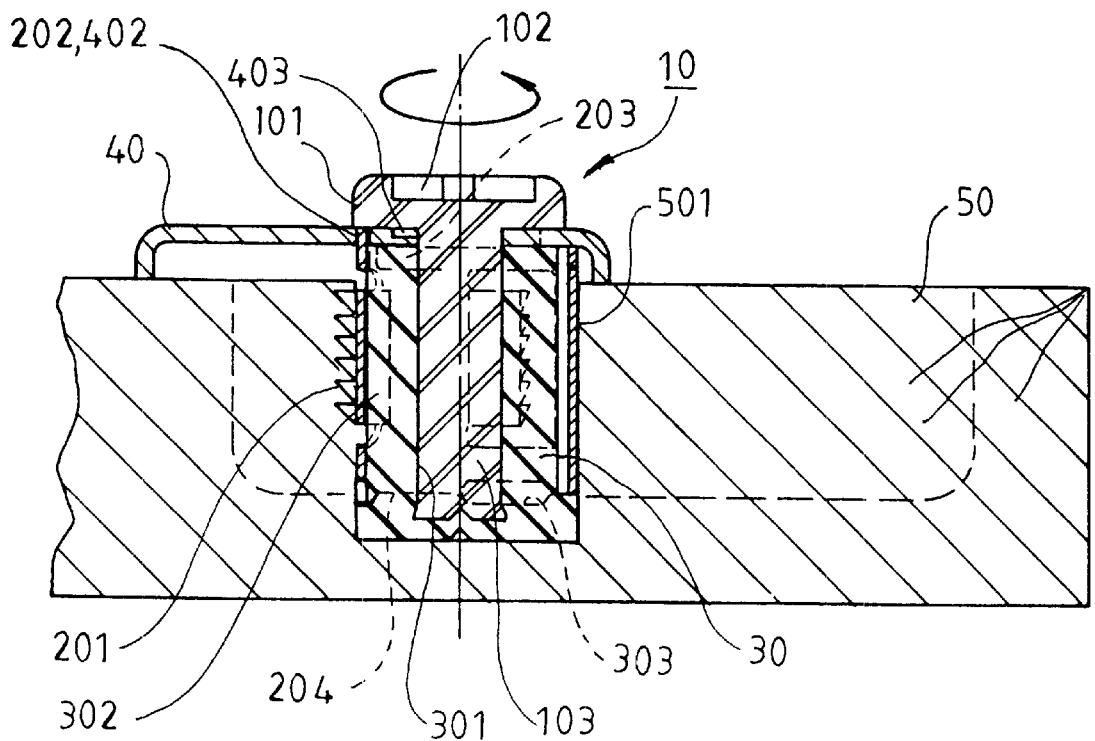
FIG. 6 is a sectional view of the bolt fixing assembly after fixing.
Figure 7:
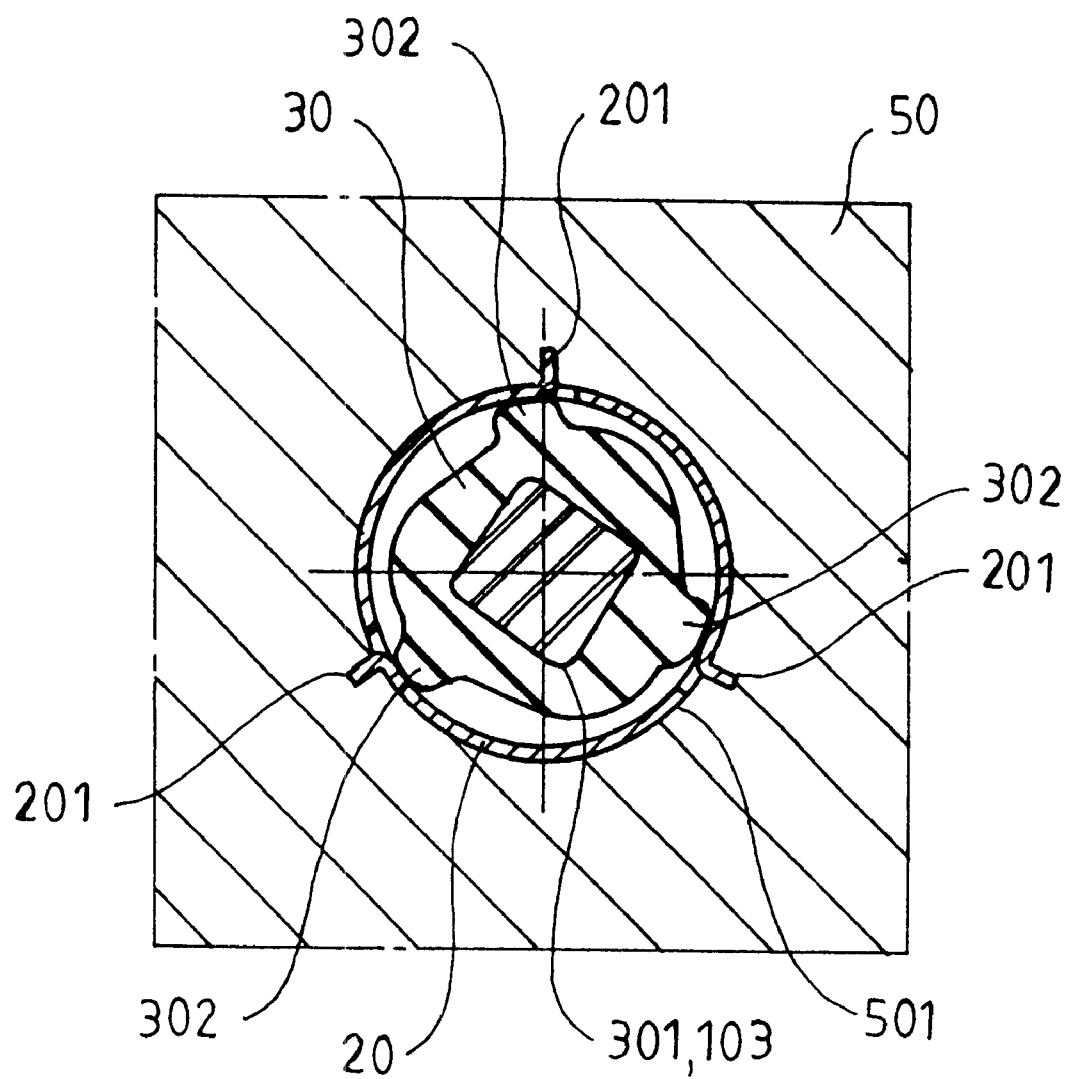
FIG. 7 is a sectional view taken along plane 7—7 in FIG. 6

FIGS. 6 and 7 show the bolt fixing assembly in accordance with the present invention in a state in which the resilient toothed plates 201 have bitten the inner wall defining the engaging hole 501 of the plate 50. When a user turns the bolt body 10 by a tool (not shown), each rib 302 of the pressing member 30 moves from a base portion of the associated toothed plate 201 toward the teeth (not labeled) of the associated toothed plate 201. The teeth of the associated toothed plate 201 bite the inner wall defining the engaging hole 501 of the plate 50 under the action of the associated ribs 302 (see FIGS. 5 and 7). Thus, the hinge base 40 (the object to be fixed) is fixed to the plate 50. Further, the pressing member 30 is turned together with the bolt body 10 such that the recesses 303 of the pressing member 30 move relative to the extensions 204 of the resilient sleeve 20 and thus cause the resilient sleeve 20 to move upward, which urge the teeth of each resilient toothed plate 201 to bite deeper into the wall defining the engaging hole 501 of the plate 50. A tighter engagement is obtained. Further, since the protrusion 104 of the bolt body 10 is restrained by an associated restraining slot 403, excessive rotation of the ribs 302 of the pressing member 30 is avoided, which, in turn, ensures the teeth of the resilient toothed plates 201 to bite the inner wall defining the engaging hole 501 of the plate 50.

Figure 1:
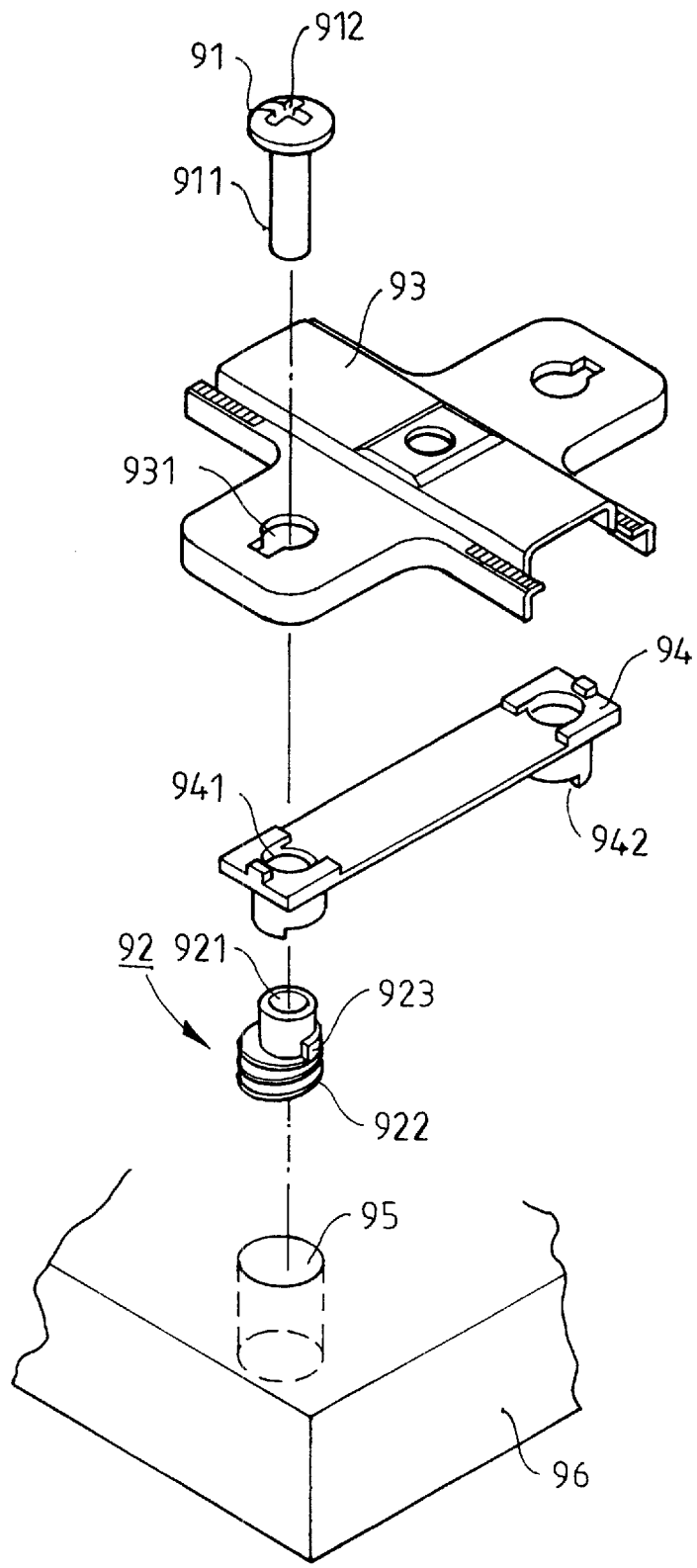
FIG. 1 is an exploded perspective view of a conventional bolt fixing assembly.

Comparing FIG. 1 with FIG. 2, the bolt fixing assembly in accordance with the present invention comprises a bolt body 10, a resilient sleeve 20, and a pressing member 30. In particular, the resilient sleeve 20 has plural outwardly extending resilient toothed plates 201, and the pressing member 30 has corresponding plural ribs 302 for urging the resilient toothed plates 201 to bite the inner wall defining the engaging hole 501 of the plate 50, thereby fixing the object to be fixed (e.g., a hinge base 40) to the plate 50. When compared with the conventional bolt fixing assembly of FIG. 1, the bolt fixing assembly in accordance with the present invention may achieve the purpose of fixing the object to the plate 50 by means of simple turning of the bolt body 10, and the bolt can be removed if the bolt body 10 is turned in a reverse direction without causing damage to the inner wall defining the engaging hole 501 of the plate 50. Thus, the bolt fixing assembly in accordance with the present invention allows easy, simple fixing and detachment.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A bolt fixing assembly comprising:
   a bolt body including a head and a shank, said shank having an outer periphery having a predetermined contour;
   a resilient sleeve including plural toothed plates integrally formed on an outer periphery thereof, each said resilient toothed plate being initially located in an interior space of said resilient sleeve and movable along a radially outward direction to a position beyond the outer periphery of said resilient sleeve; and
   a pressing member including a central hole for receiving and tightly engaging said shank of said bolt body, said central hole having an inner periphery configured corresponding to said contour of said outer periphery of said shank, said pressing member including plural ribs for respectively selectively urging said resilient toothed plates of said resilient sleeve to the position beyond said outer periphery of said resilient sleeve.

2. The bolt fixing assembly as claimed in claim 1, wherein said resilient sleeve further includes plural extensions on a bottom thereof, said pressing member further including plural recesses on a bottom edge thereof for cooperating with said extensions of said resilient sleeve, said extensions being respectively, initially engaged in said recesses, and said extensions being disengaged from said recesses when said bolt body is turned, thereby moving said resilient sleeve upward.

3. The bolt fixing assembly as claimed in claim 1, wherein said outer periphery of said shank and said inner periphery of said pressing member are non-circular.

4. A combination of a bolt fixing assembly, a plate, and an object to be fixed to the plate by said bolt fixing assembly, the combination comprising:
   a plate including an engaging hole;
   a bolt body including a head and a shank, said shank having an outer periphery having a predetermined contour;
   an object to be fixed to said plate, said object including a hole through which said shank of said bolt body extends;
   a resilient sleeve received in said engaging hole of said plate and including plural toothed plates integrally formed on an outer periphery thereof, each said resilient toothed plate being initially located in an interior space of said resilient sleeve and movable along a radially outward direction to a position beyond the outer periphery of said resilient sleeve; and a pressing member rotatably received in said resilient sleeve and including a central hole for receiving and tightly engaging said shank of said bolt body, said central hole having an inner periphery configured corresponding to said contour of said outer periphery of said shank, said pressing member including plural ribs for respectively, selectively urging said resilient toothed plates of said resilient sleeve to the position beyond said outer periphery of said resilient sleeve when said bolt body is turned;

wherein said resilient toothed plates of said resilient sleeve are moved radially outward by said ribs of said pressing member and thus bite an inner wall defining said engaging hole of said plate when said bolt body is turned.

5. The bolt fixing assembly as claimed in claim 4, wherein said bolt body further includes a protrusion, said object including a restraining slot adjacent to said hole of said object, said protrusion being engaged in said restraining slot to thereby restrain rotational movement of said bolt body.

6. The bolt fixing assembly as claimed in claim 4, wherein said resilient sleeve further includes plural extensions on a bottom thereof, said pressing member further including plural recesses on a bottom edge thereof for cooperating with said extensions of said resilient sleeve, said extensions being respectively, initially engaged in said recesses, and said extensions being disengaged from said recesses when said bolt body is turned, thereby moving said resilient sleeve upward.

7. The bolt fixing assembly as claimed in claim 6, wherein said resilient sleeve further includes plural positioning blocks, said object including plural positioning slots surrounding said hole of said object for respectively engaging with said positioning blocks.

8. The bolt fixing assembly as claimed in claim 6, wherein said resilient sleeve further includes plural resilient pieces for tightly pressing against a bottom side of said object while exerting a force to urge said extensions of said resilient sleeve to be tightly engaged in said recesses of said pressing member.

9. The bolt fixing assembly as claimed in claim 4, wherein said outer periphery of said shank and said inner periphery of said pressing member are non-circular.

* * * * *